United States Patent [19]

Mosher, Jr.

[11] 4,168,029

[45] Sep. 18, 1979

[54] STEAM TRAP

[75] Inventor: Leonard J. Mosher, Jr., Mt. Prospect, Ill.

[73] Assignee: Vapor Corporation, Chicago, Ill.

[21] Appl. No.: 685,428

[22] Filed: May 11, 1976

[51] Int. Cl.² .............................................. G05D 15/00
[52] U.S. Cl. ...................................... 236/52; 137/185
[58] Field of Search ................... 236/52, 53; 137/185; 237/9 R, 74

[56] References Cited

U.S. PATENT DOCUMENTS

| 1,870,660 | 8/1932 | Strong | 137/185 |
| 2,004,953 | 6/1935 | Kaye | 137/185 |
| 2,157,470 | 5/1939 | Adlam | 137/185 X |
| 2,174,485 | 9/1939 | Zies | 236/53 |
| 2,825,508 | 3/1958 | Velan et al. | 236/53 |
| 2,955,611 | 10/1960 | Shimizu | 137/18 S |
| 3,251,138 | 5/1966 | Whittaker | 237/9 X |

*Primary Examiner*—William E. Wayner
*Assistant Examiner*—William E. Tapolcai, Jr.
*Attorney, Agent, or Firm*—Francis J. Lidd

[57] ABSTRACT

Steam trap unit for a steam system including a casing having an inlet for receiving steam and condensate and an outlet for discharging condensate, a valve at the outlet, an actuator within the casing connected to the valve to open the valve for discharging of condensate and to close the valve for preventing the discharge of steam, and a diverter at the inlet diverting the incoming flow of steam and condensate from direct impingement on the actuator thereby preventing noisy rapid and premature valve closing action.

1 Claim, 5 Drawing Figures

U.S. Patent   Sep. 18, 1979   4,168,029
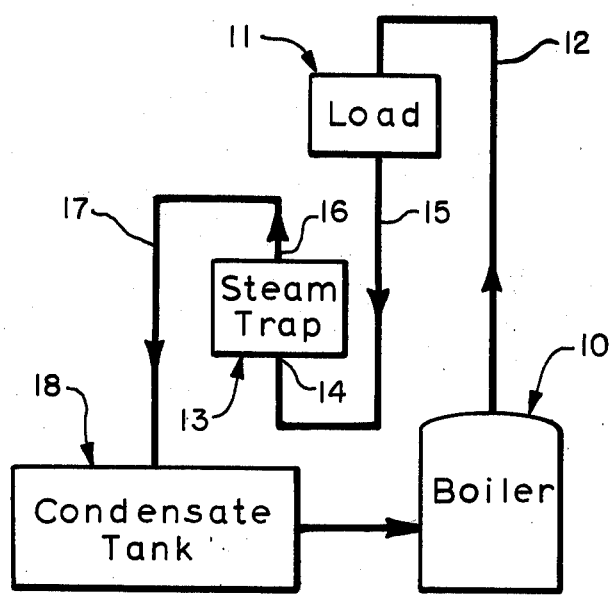
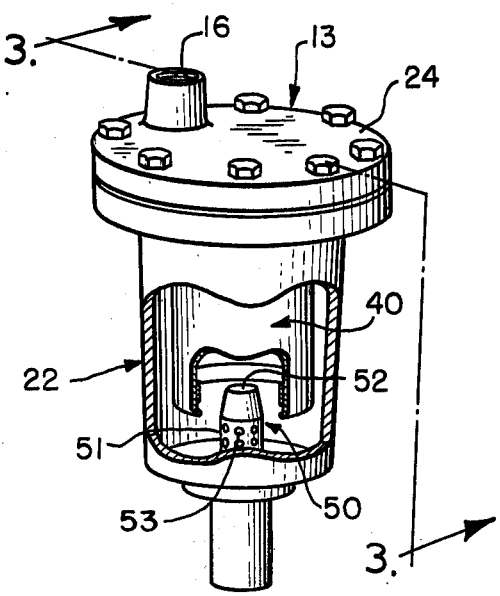
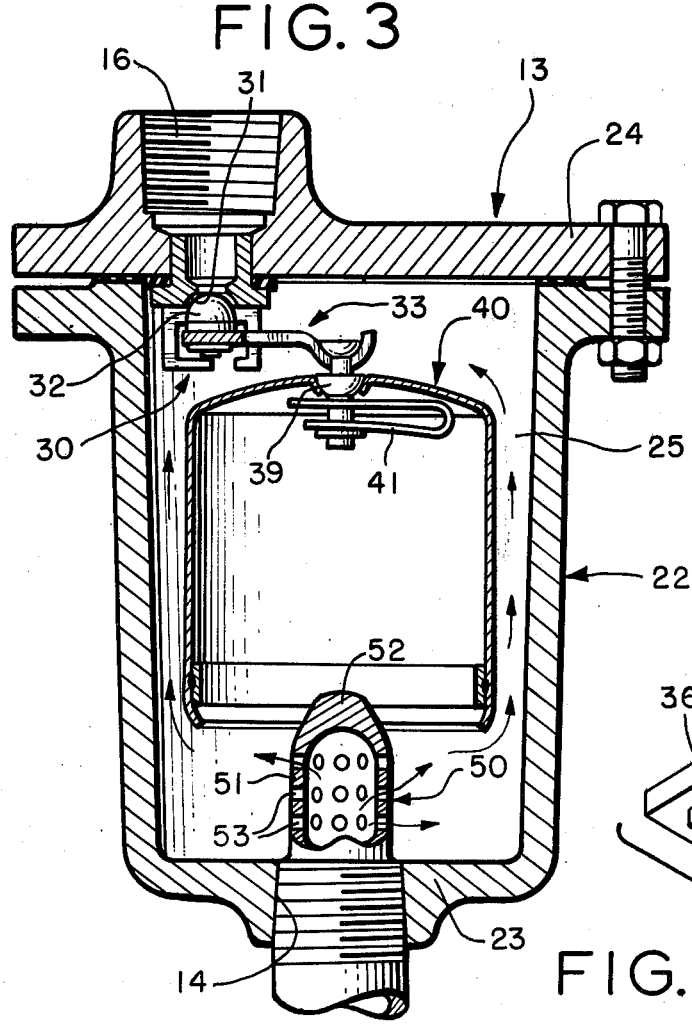
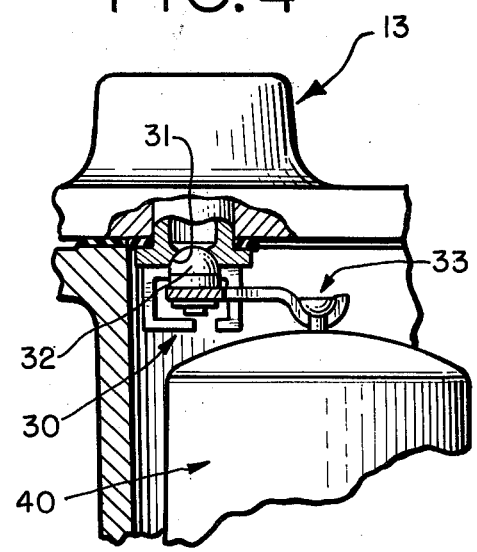
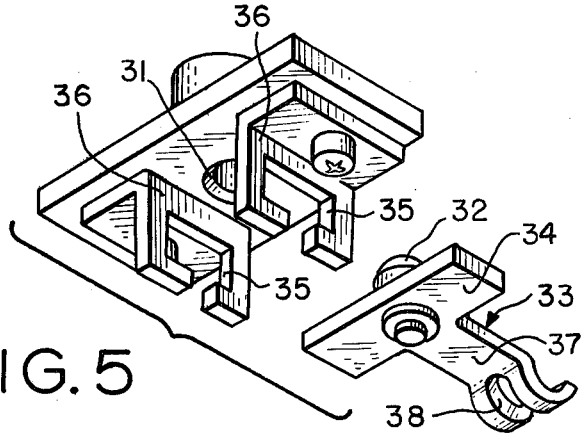

STEAM TRAP

This invention relates in general to a steam trap for a steam system to control the return of condensate, and more particularly to a steam trap capable of removing condensate or water from a steam system while preventing the passage of steam.

Systems utilizing steam for heating purposes normally include one or more loads receiving steam from a boiler, a condensate tank or receiver connected through a return condensate line to the load for receiving condensate or water from the load, and a line connecting the condensate tank to the boiler for returning water to the boiler. A steam trap is normally provided in the return condensate line to permit the return of condensate while preventing the passage of steam. Heretofore known steam traps have been objectionable inasmuch as they close prematurely and rapidly causing water hammer and vibration in the piping for the system. While the hammering is noisy and therefore objectionable, it is also damaging to the equipment of the system.

The present invention relates to a steam trap that is capable of eliminating rapid and premature closing of the trap and therefore capable of eliminating noisy and equipment-damaging hammer. More specifically, the trap of the invention includes a diverter at the inlet of the trap for diverting the incoming flow of steam and condensate so that it does not impinge directly on the actuating means of the valve which controls the discharge from the trap.

It is therefore an object of the present invention to provide a new and improved steam trap for a steam system capable of eliminating noisy and equipment-damaging hammer.

Another object of this invention is in the provision of a new and improved steam trap having means for preventing false trap actuation and water hammer in the piping connected to the trap.

A still further object of the invention is in the provision of a new and improved steam trap having a velocity diverter which prevents direct impingement of steam and condensate on the valve actuating means of the trap, thereby preventing rapid and premature closing of the trap.

Other objects, features and advantages of the invention will be apparent from the following detailed disclosure, taken in conjunction with the accompanying sheet of drawings, wherein like reference numerals refer to like parts, in which:

FIG. 1 is a block diagram of a steam system in which a steam trap according to the invention is utilized;

FIG. 2 is a perspective view of a steam trap according to the invention with some parts broken away to show underlying parts;

FIG. 3 is a greatly enlarged cross-sectional view of the steam trap shown in FIG. 2 and taken generally along line 3—3 and showing the trap in open position;

FIG. 4 is a fragmentary enlarged detail view of the trap valve and showing it in closed position; and FIG. 5 is an exploded detail perspective view of the trap valve for illustrating its operation.

Referring now to the drawings, and particularly to FIG. 1, a block diagram of a steam system is shown to illustrate the manner in which the steam trap of the present invention may be utilized. The system includes a boiler 10 which generates a steam head, a load 11 connected to the boiler by a line 12 and which utilizes the steam for heating purposes, a steam trap 13 having an inlet 14 connected through a line 15 to the load 11, and an outlet 16 connected through a line 17 to a condensate tank or receiver 18. The steam trap 13 serves to allow the passage of condensate therethrough to the condensate return line 17 and then to the tank 18 and to prevent the passage of steam. Accordingly, the steam trap removes water from the system.

The steam trap 13 includes a generally cylindrical casing 22 closed at its lower end by bottom wall 23 having the inlet 14 therein. The upper end of the casing 22 is open and has a cover 24 enclosing the casing and coacting with the casing to define therein a chamber 25. The outlet 16 is formed in the cover 24. Accordingly, the inlet 14 is at the lower end of the trap, while the outlet 16 is at the upper end of the trap.

A valve assembly 30 is mounted at the outlet 16 for selectively permitting the passage of condensate through the trap and for preventing the passage of steam. The valve assembly 30 includes a seat 31 and a valve closure member 32 coacting therewith. The seat and valve closure member are constructed to provide a seal when the closure member is in engagement with the seat and in particular the seat is somewhat spherical in shape as is the closure member. However, the valve closure member and seat structure may be of any desired type.

The valve closure member is secured on one end of a lever arm 33 which is T-shaped and includes a crossbar 34 that is freely received within a pair of opposed openings 35 formed in brackets 36. Accordingly, the crossbar 34 is capable of having limited movement within the confines of the bracket openings 35.

The lever arm 33 also includes a main bar portion 37 arcuately formed and bifurcated on its end to define a slot 38 for receiving a stem 39 and connecting to a valve actuator 40.

The valve actuator 40 is in the form of an inverted bucket and retained in place on the stem 39 by means of a retainer 41. Accordingly, the lower end of the bucket 40 is open and in facing relation with the inlet 14 of the trap.

Heretofore, steam and condensate entering the trap through the inlet 14 could impinge directly on the bucket 40. The velocity of the steam and condensate would cause lifting of the bucket and closing of the valve prematurely and in rapid fashion by the entry of intermittent slugs of steam and condensate. Closing rapidly would set up a shock wave that causes water hammer in the pipe system. It can be appreciated that such water hammer is damaging to the equipment and also causes considerable noise which is undesirable. Further, the purpose of the trap to allow removal of condensate would be somwhat defeated.

It is preferable that the trap closes due to the displacement of condensate in the trap by steam rather than due to the water velocity against the valve actuator 40. Accordingly, the present invention concerns the diverting of the water and steam as it enters the trap such that it will not directly impinge on the actuator. In this respect, a diverter 50 in the form of a thimble-like member is mounted at the inlet 14 of the trap. The diverter includes a cylindrical body 51 having an upper end wall 52 and a plurality of apertures 53 in the cylindrical body side wall wherein the steam and water entering the inlet will be diverted away from direct impingement on the actuator 40 and toward the side walls of the trap so that the velocity of the steam and water entering the trap will not cause premature closing of the trap. As can best be seen in FIG. 3, the flow of steam and water is diverted to a direction substantially perpendicular to the vertical axis of the trap. Accordingly, when condensate is in the trap, the valve will be open to allow removal of the condensate as the steam displaces the condensate, and when the condensate has been removed, the steam will cause actuation of the valve actuator 40 to close the valve and trap and prevent removal of steam. In this respect it can be appreciated that the valve actuator, together with the lever arm 33 and the valve closure member 32, will move substantially vertically upward to close the valve and substantially vertically downward to open the valve. It should be appreciated that the specific structure of the trap disclosed is old, other than the structure of the diverter. By diverting the path of the steam and condensate as it enters the trap in accordance with the present invention, premature closing is avoided, undesirable noise is avoided, and a quiet trap is provided which opens and closes slowly and which reduces wear and tear on the steam system heretofore caused by water hammer.

It will understood that modifications and variations may be effected without departing from the scope of the novel concepts of the present invention, but it is understood that this application is to be limited only by the scope of the appended claims.

The invention is hereby claimed as follows:

1. In a steam trap comprising a casing having a central inlet opening in the bottom and a condensate discharge opening in or adjacent the top, valve means for said discharge opening including a movable valve member, and an inverted bucket operatively connected with said movable valve member, the bottom open end of said bucket being located above the bottom of said casing a substantial distance, the improvement comprising a diverter in the form of a thimble-like member projecting upwardly from said inlet opening into said casing with the upper end of said thimble-like member being closed and the side wall thereof having steam and condensate outlets below the bottom end of said bucket, there being no obstructions between said thimble-like member outlets and the side wall of said casing surrounding said thimble-like member.

* * * * *